United States Patent
Xing et al.

(10) Patent No.: US 11,122,395 B2
(45) Date of Patent: Sep. 14, 2021

(54) MULTICAST DATA TRANSMISSION RESPONSE METHOD AND DEVICE, AND COMPUTER STORAGE MEDIUM

(71) Applicant: XI'AN ZHONGXING NEW SOFTWARE CO., LTD., Xi'An (CN)

(72) Inventors: Weimin Xing, Shenzhen (CN); Kaiying Lv, Shenzhen (CN); Bo Sun, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 275 days.

(21) Appl. No.: 16/319,137

(22) PCT Filed: May 23, 2017

(86) PCT No.: PCT/CN2017/085466
§ 371 (c)(1),
(2) Date: Jan. 18, 2019

(87) PCT Pub. No.: WO2018/014649
PCT Pub. Date: Jan. 25, 2018

(65) Prior Publication Data
US 2021/0105583 A1    Apr. 8, 2021

(30) Foreign Application Priority Data
Jul. 20, 2016 (CN) .......................... 201610578155.2

(51) Int. Cl.
*H04W 4/06* (2009.01)
*H04L 1/16* (2006.01)
*H04W 74/08* (2009.01)
*H04W 80/02* (2009.01)

(52) U.S. Cl.
CPC ............. *H04W 4/06* (2013.01); *H04L 1/1621* (2013.01); *H04W 74/0808* (2013.01); *H04W 80/02* (2013.01)

(58) Field of Classification Search
CPC .... H04W 4/06; H04W 74/0808; H04L 1/1621
(Continued)

(56) References Cited

U.S. PATENT DOCUMENTS

2010/0226263 A1* 9/2010 Chun .................... H04L 5/0057
370/252
2011/0116435 A1* 5/2011 Liu ........................ H04L 1/1685
370/312

FOREIGN PATENT DOCUMENTS

CN        101848096 A      9/2010
CN        101931874 A      12/2010
(Continued)

OTHER PUBLICATIONS

Extended European Search Report for EP Appl. No. 17830286.5, dated Feb. 13, 2020.
(Continued)

*Primary Examiner* — Peter G Solinsky
(74) *Attorney, Agent, or Firm* — Foley & Lardner LLP

(57) ABSTRACT

The present disclosure provides a response method and device for groupcast data transmission, and a computer storage medium. The method includes: a first node transmits at least one groupcast frame to at least one groupcast group including more than one second node; a second node receives the groupcast frame, where a groupcast address carried by the groupcast frame corresponds to a groupcast group where the second node is located; the first node transmits trigger information to second nodes corresponding to the groupcast group; the second node receives the trigger information; when being determined to be a second node for randomly contending for transmitting a groupcast response frame, the second node contends for transmitting the groupcast response frame on a random access resource block allocated by the trigger information; when being determined to be a second node for regularly transmitting the groupcast
(Continued)

response frame, the second node transmits, according to the trigger information, the groupcast response frame on a specified fixed access resource block.

20 Claims, 4 Drawing Sheets

(58) Field of Classification Search
USPC .......................................................... 370/329
See application file for complete search history.

(56) References Cited

FOREIGN PATENT DOCUMENTS

| CN | 101931874 A | 12/2010 |
|---|---|---|
| CN | 102144414 A | 8/2011 |
| CN | 102648597 A | 8/2012 |
| WO | WO-2007/148934 A1 | 12/2007 |
| WO | WO-2008/133461 A1 | 11/2008 |
| WO | WO-2010/028061 A2 | 3/2010 |
| WO | WO 2015/146204 | 10/2015 |

OTHER PUBLICATIONS

Seungho Ryu et al: "A Block ACK Transmission Scheme for Reliable Multicast in IEEE 802.11 WLANs", 2016 IEEE Conference on Computer Communications Workshops (INFOCOM WKSHPS), IEEE, Apr. 10, 2016 (Apr. 10, 2016), pp. 978-979, XP032957439, DOI: 10.1109/INFCOMW.2016.7562223 [retrieved on Sep. 6, 2016].

International Search Report for International No. PCT/CN2017/085466 dated Jul. 27, 2017.

* cited by examiner

MULTICAST DATA TRANSMISSION RESPONSE METHOD AND DEVICE, AND COMPUTER STORAGE MEDIUM

CROSS-REFERENCE TO RELATED APPLICATIONS

This is a National Stage Application, filed under 35 U.S.C. 371, of International Patent Application No. PCT/CN2017/085466, filed on May 23, 2017, which claims priority to Chinese Patent Application No. 201610578155.2 filed on Jul. 20, 2016, the contents of both of which are incorporated herein by reference in their entireties.

TECHNICAL FIELD

The present disclosure relates to the field of wireless communications, and in particular, to a response method and device for reliable groupcast data transmission in a carrier detect access network and a computer storage medium.

BACKGROUND

A basic service set (BSS) of a wireless local area network (WLAN) is generally as shown in FIG. 1. The BSS generally includes one access point (AP) and multiple non-AP stations. At present, there may be many groupcast or broadcast services (collectively referred to as groupcast services), for example, a groupcast service for video content, in the WLAN. Before a groupcast service is transmitted, generally the groupcast service should be established, a relationship is established between multiple stations and the groupcast service, and a groupcast address is configured for the groupcast service. In an early WLAN network, the groupcast service is generally a service performed with best efforts. After the AP transmits a groupcast frame, the stations provide no response and the AP does not know whether the stations have correctly received the groupcast frame so that a Quality of Service (QoS) is difficult to be guaranteed. Later, the WLAN introduced reliable groupcast technologies in two directions: one is a Directed Groupcast Service (DMS) and the other is a Groupcast with Retries (GCR). The DMS means that the groupcast service is converted into multiple unicast services, that is, groupcast data is encapsulated as unicast data and transmitted to multiple receivers respectively so that the receivers may acknowledge the groupcast service, which improves reliability; however, multiple unicast transmissions result in large overheads. The GCR includes active retries and response-based retries. The active retries mean to retransmit the same groupcast data multiple times to improve reliability, but the active retries are not based on responses of the receivers. In the response-based retries, after transmitting the groupcast data, the AP selects several stations and requests these stations to make a response. These selected stations reply with block ACK (BA) frames, and the AP determines whether to retransmit the groupcast frame according to the number of the BAs received and other factors. As shown in FIG. 2, this manner is based on feedback from the stations, but the AP cannot require all the stations to transmit response frames due to the overheads of the response frames so that the AP can only select several stations to have their responses, that is, the AP obtains statistics for receiving conditions of some stations. Therefore, the AP may not necessarily make accurate retries decisions based on the information. For example, the groupcast data received by a certain station may be very poor, but the AP does not request this station to respond. On the contrary, the AP determines that groupcast transmission qualities are pretty good according to the responses from other stations. In this way, this station cannot properly receive the groupcast data.

SUMMARY

To solve the problem that the AP cannot acquire data reception qualities of all stations so that some stations have poor reception qualities, embodiments of the present disclosure provide a response method and device for groupcast data transmission, and a computer storage medium, to enable the AP to better confirm reception conditions of groupcast data and facilitate the subsequent retransmission of the groupcast data.

An embodiment of the present disclosure provides a response method for groupcast data transmission, applied to a first node. The method includes:

transmitting, by the first node, at least one groupcast frame to at least one groupcast group, where each of the at least one groupcast group comprises more than one second node;

transmitting, by the first node, trigger information to a plurality of second nodes corresponding to the at least one groupcast group, where the trigger information is configured to trigger the plurality of second nodes to contend for transmitting a groupcast response frame on a specified random access resource block and/or trigger a specified second node to transmit the groupcast response frame on a specified fixed access resource block; and receiving, by the first node, the groupcast response frame transmitted from the plurality of second nodes.

In the embodiments of the present disclosure, the trigger information is a multi-user block acknowledgment request (MU-BAR) frame or a BAR frame or an information field for triggering the groupcast response frame.

The trigger information is further configured to allocate the fixed access resource block or the random access resource block for triggering the groupcast response frame.

In the embodiments of the present disclosure, each of the at least one groupcast group corresponds to a groupcast address, and accordingly, a reception address of each of the at least one groupcast frame is a groupcast address of a corresponding groupcast group.

In the embodiments of the present disclosure, the access resource block corresponds to resource indication information, the resource indication information is configured to indicate a resource corresponding to the access resource block, and the trigger information carries the resource indication information.

In the embodiments of the present disclosure, the resource indication information corresponding to the random access resource block includes at least one of a groupcast address and a groupcast identifier.

The resource indication information corresponding to the fixed access resource block includes at least one of the groupcast address and a unicast identifier.

In the embodiments of the present disclosure, the groupcast address includes a multi-cast address and a broadcast address.

The groupcast identifier includes a multi-cast identifier and a broadcast identifier.

In the embodiments of the present disclosure, the trigger information is aggregated in a media access control (MAC) frame header of the at least one groupcast frame.

Alternatively, the trigger information is aggregated in a radio frame where the at least one groupcast frame is located.

Alternatively, the trigger information and the at least one groupcast frame are located in different radio frames.

In the embodiments of the present disclosure, the method further includes the following step: the first node transmits random access control information of the random access resource block; where the random access control information includes at least one of the following:
- a response threshold of the second node;
- a resource contention window (RCW) of the random access resource block of the second node; and
- indication information for indicating a type of the groupcast response frame.

In the embodiments of the present disclosure, the response threshold is a control threshold for a correct-rate of corresponding groupcast frames or a random access probability.

The type of the groupcast response frame is one of: a block acknowledgement frame, an acknowledgement frame and a non-acknowledgment frame.

In the embodiments of the present disclosure, when the type of the groupcast response frame is the block acknowledgement frame, the indication information for indicating the type of the groupcast response frame further indicates that the block acknowledgement frame is a groupcast data block acknowledgement frame, a compressed block acknowledgement frame or a multi-user block acknowledgement frame.

Another embodiment of the present disclosure provides a response method for groupcast data transmission, applied to a second node. The method includes:
- receiving, by the second node, at least one groupcast frame, where a groupcast address carried in each of the at least one groupcast frame corresponds to a groupcast group where the second node is located;
- receiving, by the second node, trigger information transmitted from a first node;
- when the second node is determined to be a second node for randomly contending for transmitting a groupcast response frame, contending, by the second node, for transmitting the groupcast response frame on a random access resource block allocated by the trigger information; and
- when the second node is determined to be a second node for regularly transmitting the groupcast response frame, transmitting, by the second node, the groupcast response frame on a specified fixed access resource block according to the trigger information.

In the embodiments of the present disclosure, when the random access resource block allocated by the trigger information corresponds to a groupcast address or a groupcast identifier of the groupcast group where the second node is located, and the fixed access resource block allocated by the trigger information does not correspond to an address or a unicast identifier of the second node, the second node is determined to be the second node for randomly contending for transmitting the groupcast response frame.

When the fixed access resource block allocated by the trigger information corresponds to the address or the unicast identifier of the second node and the random access resource block allocated by the trigger information does not correspond to the groupcast address or the groupcast identifier of the groupcast group where the second node is located, the second node is determined to be the second node for regularly transmitting the groupcast response frame.

In the embodiments of the present disclosure, when the second node belongs to a plurality of groupcast groups, the groupcast response frame includes response information of groupcast frames corresponding to the plurality of groupcast groups.

In the embodiments of the present disclosure, the response information of groupcast frames corresponding to each of the plurality of groupcast groups includes a groupcast identifier or a groupcast address of the each of the plurality of groupcast groups, and a groupcast data response bitmap.

In the embodiments of the present disclosure, contending for transmitting the groupcast response frame includes the step described below.

The second node transmits the groupcast response frame by using one of at least one random access resource block allocated by contention trigger information of a resource block contention counter.

Alternatively, the second node contends for transmitting the groupcast response frame by determining whether a response threshold is satisfied.

In the embodiments of the present disclosure, the step in which the second node contends for transmitting the groupcast response frame by determining whether a response threshold is satisfied includes the steps described below.

A correct-rate of the at least one groupcast frame received by the second node is determined.

The groupcast response frame is transmitted on one of at least one random access resource block allocated if the correct-rate satisfies a first threshold or a value generated by the correct-rate satisfies a second threshold; otherwise, no groupcast response frame is transmitted.

In the embodiments of the present disclosure, the response threshold is notified by an access point (AP) or predefined by a protocol.

In the embodiments of the present disclosure, an initial value of the resource block contention counter is generated by a resource contention window (RCW), where the initial value is a random integer uniformly distributed within a range from 0 to an RCW value.

In the embodiments of the present disclosure, the RCW value is determined by an indication message transmitted from the first node.

Alternatively, the RCW value is generated by the second node, and the generated RCW value is determined by at least one of the following factors: a total number of random access resource blocks allocated by the trigger information, a total number of stations in the groupcast group, and a correct-rate of the at least one groupcast frame received by the second node and a priority of the second node.

In the embodiments of the present disclosure, the second node contends for transmitting the groupcast response frame by using the resource block contention counter in the following manner:
- after receiving the trigger information, the second node determines a total number of random access resource blocks according to the trigger information, adjusts a value of the resource block contention counter according to the number of random access resource blocks, and transmits the groupcast response frame when the value of the resource block contention counter is 0 or otherwise transmits no groupcast response frame;

The value of the resource block contention counter is adjusted by subtracting the number of random access resource blocks from a current value of the resource block contention counter.

In the embodiments of the present disclosure, a type of the groupcast response frame is a block acknowledgement frame, an acknowledgement frame or a non-acknowledgment frame; and the type of the groupcast response frame is determined in the following manner:

the second node determines the type of the groupcast response frame according to an indication of the first node, where the indication is specifically transmitting a corresponding type of groupcast response frame on a specified randomly accessed resource.

Alternatively, the second node determines the type of the groupcast response frame to be transmitted according to a reception correct-rate of the at least one groupcast frame, which specifically includes the following cases:

when all of the at least one groupcast frame are correct, the type of the groupcast response frame is the acknowledgement frame or the block acknowledgement frame; when all of the at least one groupcast frame are wrong, the type of the groupcast response frame is the non-acknowledgment frame; and when part of the at least one groupcast frame is correct, the type of the groupcast response frame is the block acknowledgement frame.

An embodiment of the present disclosure provides a response device for groupcast data transmission, applied to a first node. The device includes a transmitting unit and a receiving unit.

The transmitting unit is configured to transmit at least one groupcast frame to at least one groupcast group, each of which includes more than one second node; and to transmit trigger information to a plurality of second nodes corresponding to the at least one groupcast group, where the trigger information is configured to trigger a second node to contend for transmitting a groupcast response frame on a specified random access resource block and/or trigger a specified second node to transmit the groupcast response frame on a specified fixed access resource block.

The receiving unit is configured to receive the groupcast response frame transmitted from the plurality of second nodes.

In the embodiments of the present disclosure, the trigger information is a multi-user block acknowledgment request (MU-BAR) frame or a BAR frame or an information field for triggering the groupcast response frame.

The trigger information is further configured to allocate the fixed access resource block or the random access resource block for triggering the groupcast response frame.

In the embodiments of the present disclosure, each of the at least one groupcast group corresponds to one groupcast address, and accordingly, a reception address of each of the at least one groupcast frame is a groupcast address of a corresponding groupcast group.

In the embodiments of the present disclosure, the access resource block corresponds to resource indication information, the resource indication information is configured to indicate a resource corresponding to the access resource block, and the trigger information carries the resource indication information.

In the embodiments of the present disclosure, the resource indication information corresponding to the random access resource block includes at least one of a groupcast address and a groupcast identifier.

The resource indication information corresponding to the fixed access resource block includes at least one of the groupcast address and a unicast identifier.

In the embodiments of the present disclosure, the groupcast address includes a multi-cast address and a broadcast address.

The groupcast identifier includes a multi-cast identifier and a broadcast identifier.

In the embodiments of the present disclosure, the trigger information is aggregated in a media access control (MAC) frame header of the at least one groupcast frame.

Alternatively, the trigger information is aggregated in a radio frame where the at least one groupcast frame is located.

Alternatively, the trigger information and the at least one groupcast frame are located in different radio frames.

In the embodiments of the present disclosure, the transmitting unit is further configured to transmit random access control information of the random access resource block; where the random access control information includes at least one of the following: a response threshold of the second node, a random access resource contention window (RCW) of the second node; and indication information indicating a type of the groupcast response frame.

In the embodiments of the present disclosure, the response threshold is a control threshold for a correct-rate of corresponding groupcast frames or a random access probability.

The type of the groupcast response frame is one of: a block acknowledgement frame, an acknowledgement frame and a non-acknowledgment frame.

In the embodiments of the present disclosure, when the type of the groupcast response frame is the block acknowledgement frame, the indication information indicating the type of the groupcast response frame further indicates that the block acknowledgement frame is a groupcast data block acknowledgement frame, a compressed block acknowledgement frame or a multi-user block acknowledgement frame.

Another embodiment of the present disclosure provides a response device for groupcast data transmission, applied to a second node. The device includes a receiving unit and a transmitting unit.

The receiving unit is configured to receive at least one groupcast frame, where a groupcast address carried in each of the at least one groupcast frame corresponds to a groupcast group where the second node is located; and to receive trigger information transmitted from a first node.

The transmitting unit is configured to contend for transmitting a groupcast response frame on a random access resource block allocated by the trigger information when the second node is determined to be a second node for randomly contending for transmitting the groupcast response frame; and to transmit, according to the trigger information, the groupcast response frame on a specified fixed access resource block when the second node is determined to be a second node for regularly transmitting the groupcast response frame.

In the embodiments of the present disclosure, when the random access resource block allocated by the trigger information corresponds to a groupcast address or a groupcast identifier of the groupcast group where the second node is located, and the fixed access resource block allocated by the trigger information does not correspond to an address or a unicast identifier of the second node, the second node is determined to be the second node for randomly contending for transmitting the groupcast response frame.

When the fixed access resource block allocated by the trigger information corresponds to the address or the unicast identifier of the second node and the random access resource block allocated by the trigger information does not correspond to the groupcast address or the groupcast identifier of the groupcast group where the second node is located, the second node is determined to be the second node for regularly transmitting the groupcast response frame.

In the embodiments of the present disclosure, when the second node belongs to a plurality of groupcast groups, the groupcast response frame includes response information of groupcast frames corresponding to the plurality of groupcast groups.

In the embodiments of the present disclosure, the response information of groupcast frames corresponding to each of the plurality of groupcast groups includes a groupcast identifier or a groupcast address of the each of the plurality of groupcast groups, and a groupcast data response bitmap.

In the embodiments of the present disclosure, the transmitting unit is further configured to transmit the groupcast response frame by using one of at least one random access resource block allocated by contention trigger information of a resource block contention counter; or to contend for transmitting the groupcast response frame by determining whether a response threshold is satisfied.

In the embodiments of the present disclosure, the device further includes a processing unit.

The processing unit is configured to determine a correct-rate of the at least one groupcast frame received by the second node.

The transmitting unit is further configured to transmit the groupcast response frame on one of at least one random access resource block allocated if the correct-rate satisfies a first threshold or a value generated by the correct-rate satisfies a second threshold; otherwise, to transmit no groupcast response frame.

In the embodiments of the present disclosure, the response threshold is notified by an access point (AP) or predefined by a protocol.

In the embodiments of the present disclosure, an initial value of the resource block contention counter is generated by a resource contention window (RCW), where the initial value is a random integer uniformly distributed within a range from 0 to an RCW value.

In the embodiments of the present disclosure, the RCW value is determined with an indication message transmitted by the first node.

Alternatively, the RCW value is generated by the second node, and the generated RCW value is determined by at least one of the following factors: a total number of random access resource blocks allocated by the trigger information, a total number of stations in the groupcast group, and a correct-rate of the at least one groupcast frame received by the second node and a priority of the second node.

In the embodiments of the present disclosure, the transmitting unit is further configured to, after the receiving unit has received the trigger information, determine a total number of random access resource blocks according to the trigger information, adjust a value of the resource block contention counter according to the number of random access resource blocks, and transmit the groupcast response frame when the value of the resource block contention counter is 0 or otherwise transmit no groupcast response frame. The value of the resource block contention counter is adjusted by subtracting the number of random access resource blocks from a current value of the resource block contention counter.

In the embodiments of the present disclosure, a type of the groupcast response frame is a block acknowledgement frame, an acknowledgement frame or a non-acknowledgment frame; and the type of the groupcast response frame is determined in the following manner:

the second node determines the type of the groupcast response frame according to an indication of the first node, where the indication is specifically transmitting a corresponding type of groupcast response frame on a specified randomly accessed resource.

Alternatively, the second node determines the type of the groupcast response frame to be transmitted according to a reception correct-rate of the at least one groupcast frame, which specifically includes the following cases:

when all of the at least one groupcast frame are correct, the type of the groupcast response frame is the acknowledgement frame or the block acknowledgement frame; when all of the at least one groupcast frame are wrong, the type of the groupcast response frame is the non-acknowledgement frame; and when part of the at least one groupcast frame is correct, the type of the groupcast response frame is the block acknowledgement frame.

The embodiments of the present disclosure further provide a computer storage medium storing computer programs which are configured to execute the response methods for groupcast data transmission described above.

The embodiments of the present disclosure provide the following technical solutions: a first node transmits at least one groupcast frame to at least one groupcast group, each of which includes more than one second node; the first node transmits trigger information to a plurality of second nodes corresponding to the at least one groupcast group, where the trigger information is configured to trigger a second node to contend for transmitting a groupcast response frame on a specified random access resource block and/or trigger a specified second node to transmit the groupcast response frame on a specified fixed access resource block; and the first node receives the groupcast response frame transmitted from the plurality of second nodes. In can be seen that the first node allocate randomly accessed resources and/or fixed access resources corresponding to the groupcast response frame through the trigger information to enable the second nodes to contend for transmitting the groupcast response frame and/or regularly transmit the groupcast response frame according to qualities of the groupcast frames received by the second nodes so that the first node such as an AP can better confirm a reception condition of groupcast data, which facilitates subsequent retransmission of the groupcast data.

BRIEF DESCRIPTION OF DRAWINGS

The drawings generally illustrate various embodiments discussed in the present disclosure by way of examples not limitations.

DETAILED DESCRIPTION

To provide a more detailed understanding of features and content of embodiments of the present disclosure, implementation of the embodiments of the present disclosure is described below in detail with reference to the drawings. The drawings are provided for reference only and are not intended to limit the embodiments of the present disclosure.

The embodiments of the present disclosure provide a method for enabling a station to provide feedback according to its own groupcast data reception quality and improving groupcast transmission reliability. In the embodiments of the present disclosure, random access resource blocks are allocated by using the BAR/MU-BAR to trigger the station to contend for transmitting a groupcast response frame in a resource domain (frequency domain) instead of specifying, by an AP, particular stations to transmit the groupcast response frame in the related art. According to the received BAR/MU-BAR and a quality of groupcast data received by the station, the station contends for transmitting the groupcast response frame. A BA transmitted from the station may be directed at multiple groupcast services, and each of the groupcast services has corresponding response information in the groupcast response frame, including a corresponding groupcast address and response bitmap.

Figure 4:
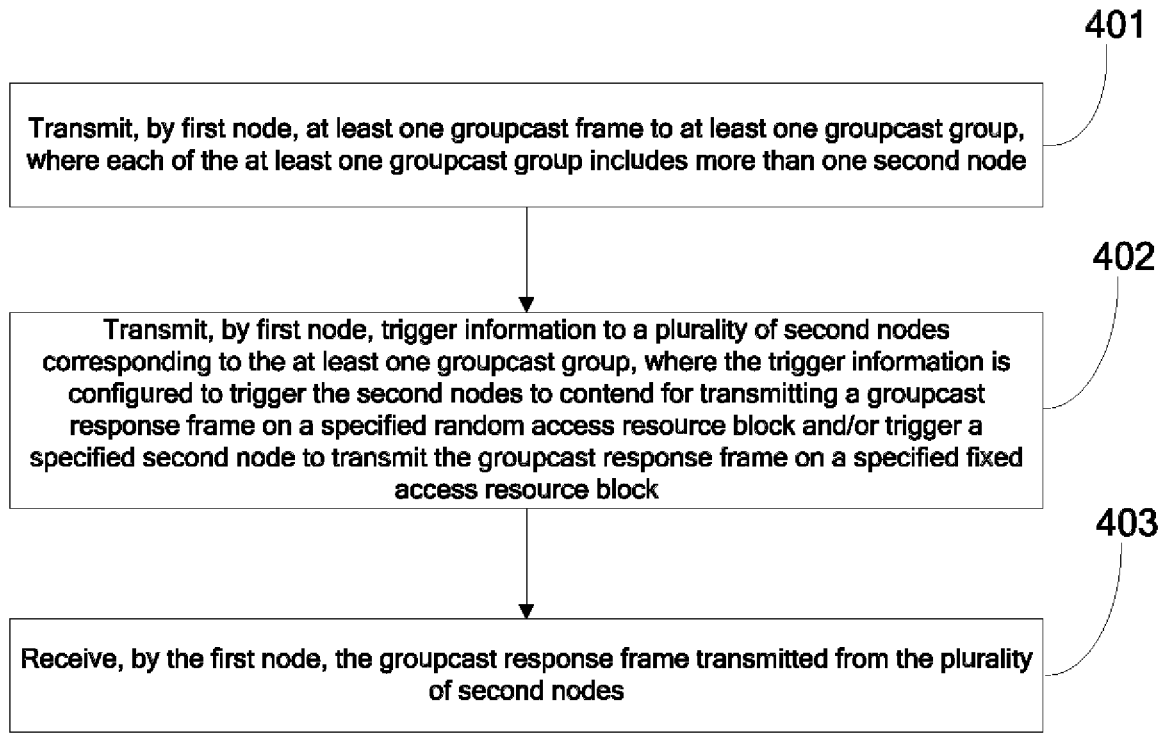
FIG. 4 is a flowchart 1 of a response method for groupcast data transmission according to an embodiment of the present disclosure.

FIG. 4 is a flowchart 1 of a response method for groupcast data transmission according to an embodiment of the present disclosure. The response method for groupcast data transmission in the example is applied to a first node which is a groupcast data transmitting end. The groupcast data transmitting end may be the AP or may be another device such as a base station and a special station capable of communicating with multiple stations. Any node capable of transmitting the groupcast data may be considered as the first node. As shown in FIG. 4, the response method for groupcast data transmission includes steps described below.

In step 401, the first node transmits at least one groupcast frame to at least one groupcast group, where each of the at least one groupcast group includes more than one second node.

In the embodiments of the present disclosure, the second node is a groupcast data receiving end, such as a station.

Herein the groupcast frame is also referred to as groupcast data.

In step 402, the first node transmits trigger information to a plurality of second nodes corresponding to the at least one groupcast group, where the trigger information is configured to trigger a second node to contend for transmitting a groupcast response frame on a specified random access resource block and/or trigger a specified second node to transmit the groupcast response frame on a specified fixed access resource block.

In step 403, the first node receives the groupcast response frames transmitted from the plurality of second nodes.

In the embodiments of the present disclosure, the trigger information is a MU-BAR or a BAR or an information field for triggering the groupcast response frame.

The trigger information is further configured to allocate the fixed access resource block or the random access resource block for triggering the groupcast response frame.

In the embodiments of the present disclosure, each groupcast group corresponds to one groupcast address, and accordingly, a reception address of each groupcast frame is the groupcast address of a corresponding groupcast group.

In the embodiments of the present disclosure, the access resource block corresponds to resource indication information. The resource indication information is configured to indicate a resource corresponding to the access resource block, and is carried in the trigger information.

The access resource block may be one of the followings or any combination thereof: an Orthogonal Frequency Division Multiple Access (OFDMA) resource block, and a Multiple-Input Multiple-Output (MIMO) spatial domain resource block, a time domain resource block and a code domain multiple access resource block.

In the embodiments of the present disclosure, the resource indication information corresponding to the random access resource block includes at least one of a groupcast address and a groupcast identifier.

The resource indication information corresponding to the fixed access resource block includes at least one of the groupcast address and a unicast identifier.

In the embodiments of the present disclosure, the groupcast address includes a multi-cast address and a broadcast address.

The groupcast identifier includes a multi-cast identifier and a broadcast identifier.

In the embodiments of the present disclosure, the trigger information is aggregated in a MAC frame header of the groupcast frame.

Alternatively, the trigger information is aggregated in a radio frame where the groupcast frame is located.

Alternatively, the trigger information and the groupcast frame are located in different radio frames. Here, the radio frame may be, for example, a Protocol Data Unit (PDU), and may specifically be a physical protocol data unit (PPDU).

In the embodiments of the present disclosure, the method further includes transmitting, by the first node (the transmitting end), random access control information for the random access resource block. The random access control information includes at least one of the followings:

a receiving end response threshold of the second node;

a receiving end random access RCW of the second node; and an indication information for indicating a type of the groupcast response frame.

In the embodiments of the present disclosure, the response threshold is a control threshold for a correct-rate of corresponding groupcast frames or a random access probability.

The type of the groupcast response frame is one of: a block acknowledgement frame, an acknowledgement frame and a non-acknowledgment frame.

In the embodiments of the present disclosure, when the groupcast response frame is the block acknowledgement frame, the indication information for indicating the type of the groupcast response frame further indicates that the block acknowledgement frame is a groupcast data block acknowledgement frame, a compressed block acknowledgement frame or a multi-user block acknowledgement frame.

Figure 5:
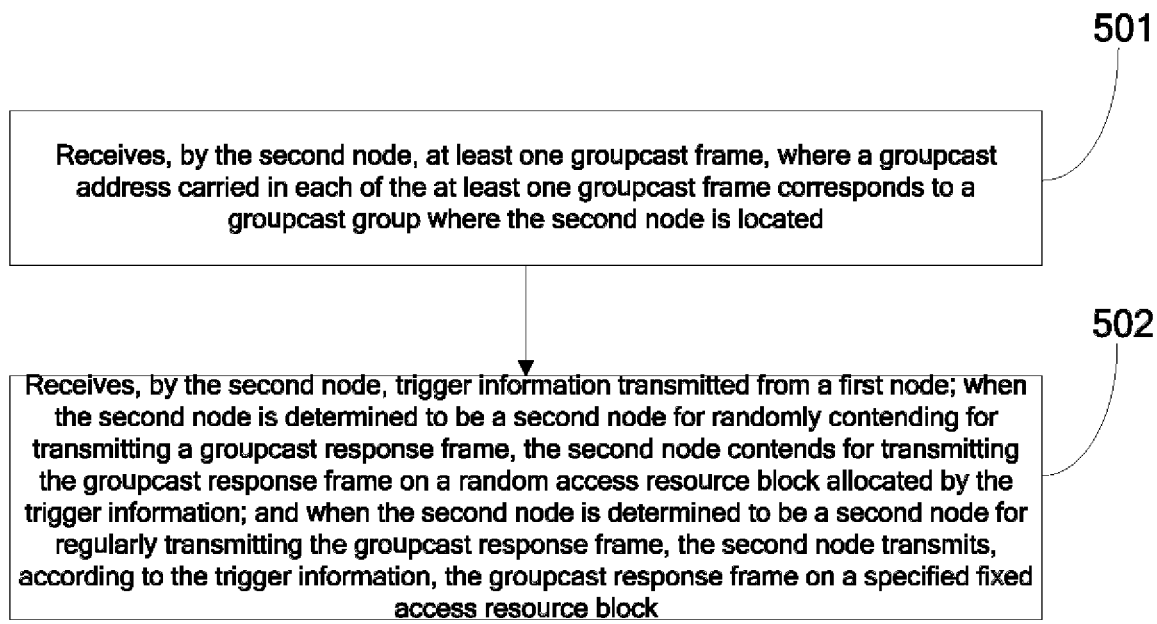
FIG. 5 is a flowchart 2 of a response method for groupcast data transmission according to an embodiment of the present disclosure.

FIG. 5 is a flowchart 2 of a response method for groupcast data transmission according to an embodiment of the present disclosure. The response method for groupcast data transmission in the example is applied to a second node. As shown in FIG. 5, the response method for groupcast data transmission includes steps described below.

In step 501, the second node receives at least one groupcast frame, where a groupcast address carried in each of the at least one groupcast frame corresponds to a groupcast group where the second node is located.

In step 502, the second node receives trigger information transmitted from a first node; if the second node is determined to randomly contend for transmitting a groupcast response frame, the second node contends for transmitting the groupcast response frame on a random access resource block allocated by the trigger information; and if the second node is determined to regularly transmit the groupcast response frame, the second node transmits, according to the trigger information, the groupcast response frame on a specified fixed access resource block.

In the embodiments of the present disclosure, when the random access resource block allocated by the trigger information corresponds to a groupcast address or a groupcast identifier of the groupcast group where the second node is located and the fixed access resource block allocated by the trigger information does not correspond to an address or a unicast identifier of the second node, the second node is determined to randomly contend for transmitting the groupcast response frame.

When the fixed access resource block allocated by the trigger information corresponds to the address or the unicast identifier of the second node and the random access resource block allocated by the trigger information does not correspond to the groupcast address or the groupcast identifier of the groupcast group where the second node is located, the second node is determined to regularly transmit the groupcast response frame.

In the embodiments of the present disclosure, when the second node belongs to a plurality of groupcast groups, the groupcast response frame includes response information about groupcast frames corresponding to the plurality of groupcast groups.

In the embodiments of the present disclosure, the response information about groupcast frames corresponding to each of the plurality of groupcast groups includes a groupcast identifier or a groupcast address of the groupcast group, and a groupcast data response bitmap In the embodiments of the present disclosure, a step of competing to transmit the groupcast response frame includes the step described below.

The second node transmits the groupcast response frame by using one of at least one random access resource block allocated by contention trigger information of a resource block contention counter.

Alternatively, the second node contends for transmitting the groupcast response frame by determining whether a response threshold is satisfied.

In the embodiments of the present disclosure, the step in which the second node contends for transmitting the groupcast response frame by determining whether a response threshold is satisfied includes:
  determining a correct-rate of the at least one groupcast frame received by the second node;
  transmitting the groupcast response frame on one of at least one random access resource block allocated if the correct-rate satisfies a first threshold or a value generated by the correct-rate satisfies a second threshold; otherwise, no groupcast response frame is transmitted.

In the embodiments of the present disclosure, the response threshold is notified by an AP or predefined by a protocol.

In the embodiments of the present disclosure, an initial value of the resource block contention counter is generated by a resource contention window (RCW), where the initial value is a random integer uniformly distributed within a range from 0 to an RCW value. Here, the random integer uniformly distributed within the range from 0 to the RCW value refers to a random integer within the range from 0 to the RCW value and appearing at a same possibility within the range from 0 to the RCW value.

In the embodiments of the present disclosure, the RCW value is determined by an indication message transmitted from the first node. Specifically, the RCW value is indicated in signaling transmitted from the groupcast data transmitting end.

Alternatively, the RCW value is generated by the second node, and the generated RCW value is determined by at least one of the following factors: the number of random access resource blocks allocated by the trigger information, the number of stations in the groupcast group, and a correct-rate of the groupcast frame receiving by the second node and a priority of the second node.

In the embodiments of the present disclosure, the second node contends for transmitting the groupcast response frame by using the resource block contention counter in the following manner:

After receiving the trigger information, the second node determines the number of random access resource blocks according to the trigger information, adjusts a value of the resource block contention counter according to the number of random access resource blocks, and transmits the groupcast response frame when the value of the resource block contention counter is 0. Otherwise, no groupcast response frame is transmitted.

The value of the resource block contention counter is adjusted by subtracting the number of random access resource blocks from a current value of the resource block contention counter.

In the embodiments of the present disclosure, a type of the groupcast response frame is a block acknowledgement frame, an acknowledgement frame or a non-acknowledgement frame. The type of the groupcast response frame is determined in the following manner:
  determining, by the second node, the type of the groupcast response frame according to an indication of the first node; where the indication is specifically transmitting a corresponding type of groupcast response frame on a specified random access resource.

Alternatively, the second node determines the type of the groupcast response frame to be transmitted according to a reception correct-rate of the at least one groupcast frame, which specifically includes the following cases:

When all the groupcast frames are correct, the type of the groupcast response frame is the acknowledgement frame or the block acknowledgement frame; when all the groupcast frames are wrong, the type of the groupcast response frame is the non-acknowledgement frame; and when part of the groupcast frames are correct, the type of the groupcast response frame is the block acknowledgement frame.

Figure 6:
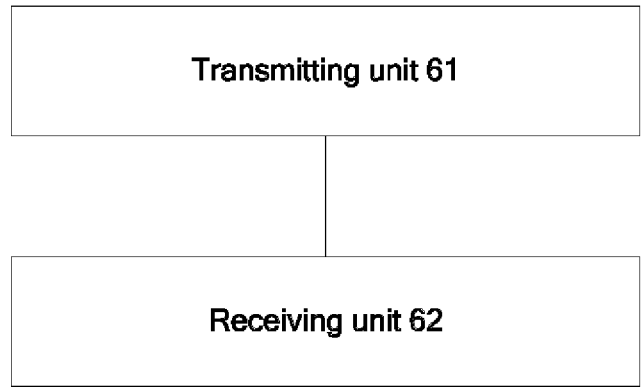
FIG. 6 is a structural diagram 1 of a response device for groupcast data transmission according to an embodiment of the present disclosure.

FIG. 6 is a structural diagram 1 of a response device for groupcast data transmission according to an embodiment of the present disclosure. The response device for groupcast data transmission in the example is applied to a first node. As shown in FIG. 6, the device includes a transmitting unit 61 and a receiving unit 62.

The transmitting unit 61 is configured to: transmit at least one groupcast frame to at least one groupcast group, where each of the groupcast group includes more than one second node; transmit trigger information to a plurality of second nodes corresponding to the at least one groupcast group. The trigger information is configured to trigger the second nodes to contend for transmitting a groupcast response frame on a specified random access resource block and/or trigger a specified second node to transmit the groupcast response frame on a specified fixed access resource block.

The receiving unit 62 is configured to receive the groupcast response frame transmitted from the plurality of second nodes.

In the embodiments of the present disclosure, the trigger information is a MU-BAR or a BAR or an information field for triggering the groupcast response frame.

The trigger information is further configured to allocate the fixed access resource block or the random access resource block for triggering the groupcast response frame.

In the embodiments of the present disclosure, each groupcast group corresponds to one groupcast address, and accordingly, a reception address of each groupcast frame is the groupcast address of a corresponding groupcast group.

In the embodiments of the present disclosure, the access resource block corresponds to resource indication information. The resource indication information is configured to indicate a resource corresponding to the access resource block, and is carried in the trigger information.

The access resource block includes one of the following or any combination thereof: an OFDMA resource block, and an MIMO spatial domain resource block, a time domain resource block and a code domain multiple access resource block.

In the embodiments of the present disclosure, the resource indication information corresponding to the random access resource block includes at least one of a groupcast address and a groupcast identifier.

The resource indication information corresponding to the fixed access resource block includes at least one of the groupcast address and a unicast identifier.

In the embodiments of the present disclosure, the groupcast address includes a multi-cast address and a broadcast address.

The groupcast identifier includes a multi-cast identifier and a broadcast identifier.

In the embodiments of the present disclosure, the trigger information is aggregated in a MAC frame header of the at least one groupcast frame.

Alternatively, the trigger information is aggregated in a radio frame where the at least one groupcast frame is located.

Alternatively, the trigger information and the at least one groupcast frame are located in different radio frames.

In the embodiments of the present disclosure, the transmitting unit is further configured to transmit random access control information about the random access resource block. The random access control information includes at least one of the following: a response threshold of the second node, a random access RCW of the second node; and indication information for indicating a type of the groupcast response frame.

In the embodiments of the present disclosure, the response threshold is a control threshold for a correct-rate of corresponding groupcast frames or a random access probability.

The groupcast response frame is one of: a block acknowledgement frame, an acknowledgement frame and a non-acknowledgment frame.

In the embodiments of the present disclosure, when the groupcast response frame is the block acknowledgement frame, the indication information for indicating the type of the groupcast response frame further indicates that the block acknowledgement frame is a groupcast data block acknowledgement frame, a compressed block acknowledgement frame or a multi-user block acknowledgement frame.

In practical applications, the functions of various units of the response device for groupcast data transmission may be implemented by a Central Processing Unit (CPU) or a Micro Processor Unit (MPU) or a Digital Signal Processor (DSP) or a Field Programmable Gate Array (FPGA) or the like located in the response device for groupcast data transmission.

Figure 7:
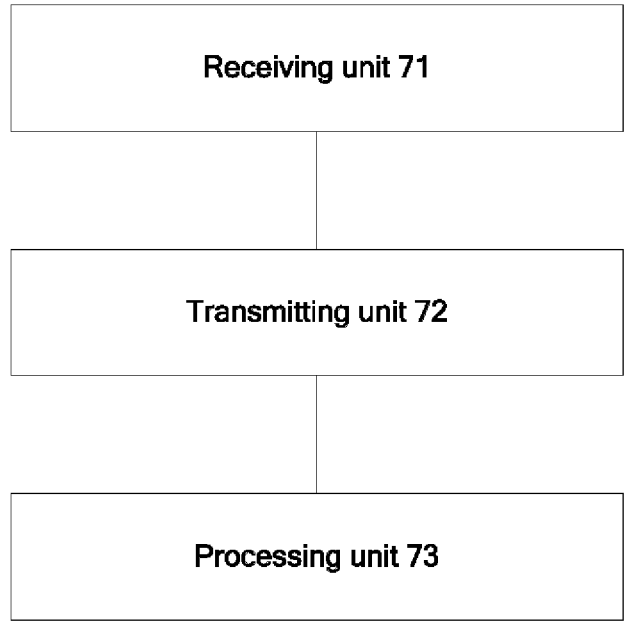
FIG. 7 is a structural diagram 2 of a response device for groupcast data transmission according to an embodiment of the present disclosure.

FIG. 7 is a structural diagram 2 of a response device for groupcast data transmission according to an embodiment of the present disclosure. The response device for groupcast data transmission in the example is applied to a second node. As shown in FIG. 7, the device includes a receiving unit 71 and a transmitting unit 72.

The receiving unit 71 is configured to: receive at least one groupcast frame; and receive trigger information transmitted from a first node, where a groupcast address carried in each of the at least one groupcast frame corresponds to a groupcast group where the second node is located.

The transmitting unit 72 is configured to: contend for transmitting a groupcast response frame on a random access resource block allocated by the trigger information when the second node is determined to randomly contend for transmitting the groupcast response frame; and transmit, according to the trigger information, the groupcast response frame on a specified fixed access resource block when the second node is determined to regularly transmit the groupcast response frame.

In the embodiments of the present disclosure, when the random access resource block allocated by the trigger information corresponds to a groupcast address or a groupcast identifier of the groupcast group where the second node is located, and the fixed access resource block allocated by the trigger information does not correspond to an address or a unicast identifier of the second node, the second node is determined to randomly contend for transmitting the groupcast response frame.

When the fixed access resource block allocated by the trigger information corresponds to the address or the unicast identifier of the second node and the random access resource block allocated by the trigger information does not correspond to the groupcast address or the groupcast identifier of the groupcast group where the second node is located, the second node is determined to regularly transmit the groupcast response frame.

In the embodiments of the present disclosure, when the second node belongs to a plurality of groupcast groups, the groupcast response frame includes response information about groupcast frames corresponding to the plurality of groupcast groups.

In the embodiments of the present disclosure, the response information about groupcast frames corresponding to each of the plurality of groupcast groups includes a groupcast identifier or a groupcast address of the each of the plurality of groupcast groups, and a groupcast data response bitmap.

In the embodiments of the present disclosure, the transmitting unit is further configured to transmit the groupcast response frame by using one of at least one random access resource block allocated by contention trigger information of a resource block contention counter; or to contend for transmitting the groupcast response frame by determining whether a response threshold is satisfied.

In the embodiments of the present disclosure, the device further includes a processing unit 73.

The processing unit 73 is configured to determine a correct-rate of the at least one groupcast frame received by the second node.

The transmitting unit 72 is further configured to: transmit the groupcast response frame on one of at least one random access resource block allocated if the correct-rate satisfies a first threshold or a value generated by the correct-rate satisfies a second threshold; transmit no groupcast response frame if the correct-rate does not satisfy the first threshold and the value generated by the correct-rate does not satisfy the second threshold.

In the embodiments of the present disclosure, the response threshold is notified by an AP or predefined by a protocol.

In the embodiments of the present disclosure, an initial value of the resource block contention counter is generated by an RCW, where the initial value is a random integer uniformly distributed within a range from 0 to an RCW value.

In the embodiments of the present disclosure, the RCW value is determined by an indication message transmitted from the first node.

Alternatively, the RCW value is generated by the second node, and the generated RCW value is determined by at least one of the following factors: the number of random access resource blocks allocated by the trigger information, the number of stations in the groupcast group, and a correct-rate of the at least one groupcast frame received by the second node and a priority of the second node.

In the embodiments of the present disclosure, the transmitting unit 72 is further configured to determine the number of random access resource blocks according to the trigger information after the trigger information is received by the receiving unit, adjust a value of the resource block contention counter according to the number of random access resource blocks, and transmit the groupcast response frame when the value of the resource block contention counter is 0 or otherwise transmit no groupcast response frame. The value of the resource block contention counter is adjusted by subtracting the number of random access resource blocks from a current value of the resource block contention counter.

In the embodiments of the present disclosure, a type of the groupcast response frame is a block acknowledgement frame, an acknowledgement frame or a non-acknowledgement frame. The type of the groupcast response frame is determined in the following manner:

determining, by the second node, the type of the groupcast response frame according to an indication of the first node, where the indication is specifically transmitting a corresponding type of groupcast response frame on a specified randomly accessed resource.

Alternatively, the second node determines the type of the groupcast response frame to be transmitted according to a reception correct-rate of the at least one groupcast frame, which specifically includes the following cases:

When all of the at least one groupcast frame is correct, the groupcast response frame is the acknowledgement frame or the acknowledgement frame; when all of the at least one groupcast frame is wrong, the groupcast response frame is the non-acknowledgement frame; and when part of the at least one groupcast frame is correct, the groupcast response frame is the block acknowledgement frame.

In practical applications, the functions of various units of the response device for groupcast data transmission may be implemented by a CPU or an MPU or a DSP or an FPGA or the like located in the response device for groupcast data transmission.

The response method for groupcast data transmission according to the embodiments of the present disclosure will be further described below in detail in conjunction with specific application scenarios.

Embodiment 1

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

Figure 1:
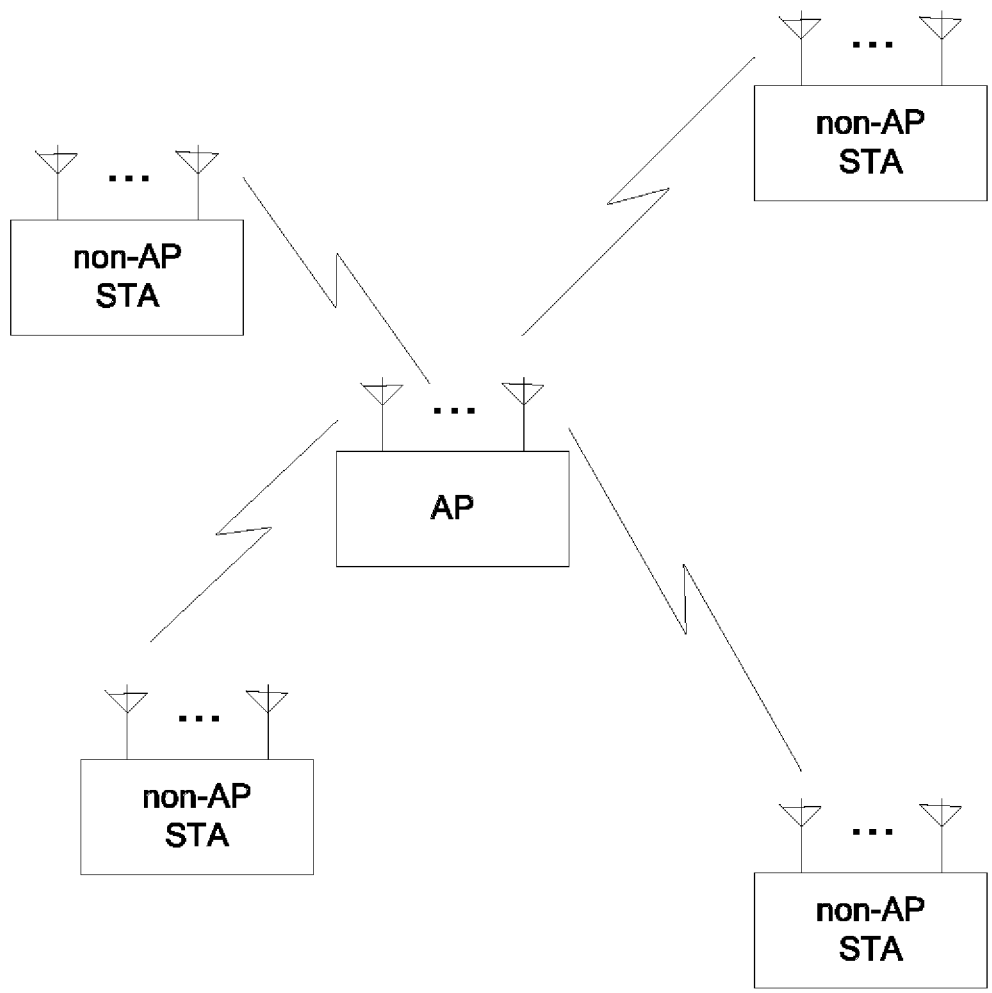
FIG. 1 is a diagram illustrating a network structure of a WLAN infrastructure.
Figure 2:
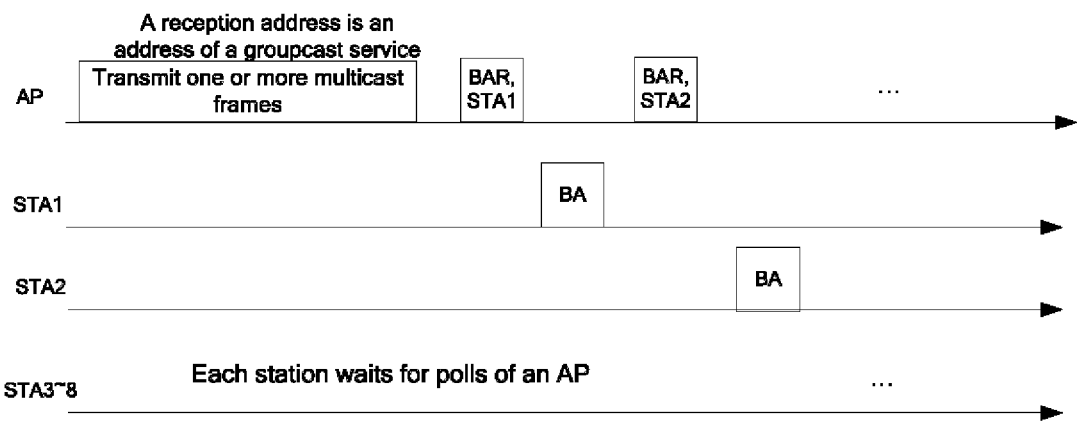
FIG. 2 is a diagram illustrating a retransmission and response process of a conventional Groupcast with Retries (GCR)
Figure 3:
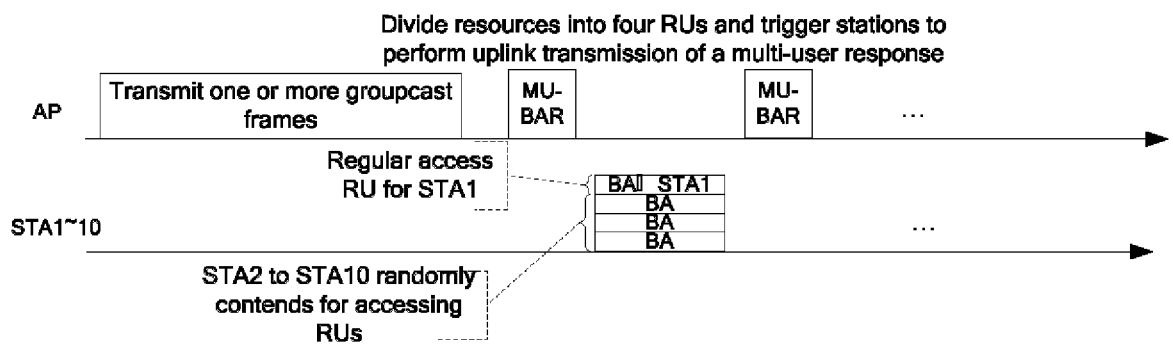
FIG. 3 illustrates an example of competing to transmit a groupcast response frame by random accesses for a groupcast service according to an embodiment of the present disclosure.

The AP and multiple stations STA1 to STA20 constitute a BSS, and a groupcast service 1 is established between the AP and STA1 to STA10. Accordingly, STA1 to STA10 are considered as groupcast group 1, and groupcast MAC address 1 for identifying the groupcast service is allocated to groupcast group 1. A main difference between the groupcast MAC address and a unicast MAC address (MAC addresses of STA1 to STA10) is that individual/group (I/G) bit of the groupcast MAC address is set as 1 while the I/G bit of the unicast address is set as 0. For example, in the 802.11 standard, a bit B40 of a MAC address of 48 bits (B0-B47) is the I/G bit. The AP acquires a transmission opportunity to transmit groupcast frames. As shown in FIG. 3, the AP transmits one or more groupcast frames to each station in the groupcast group 1 and a reception address of each groupcast frame is set as the above groupcast MAC address to identify a corresponding groupcast group which receives the groupcast frames, that is, STA1 to STA10. For statistics of a success rate of the groupcast frames transmitted, after transmitting the groupcast frames, the AP may require the stations in the groupcast group to transmit a groupcast response frame such as a BA. The groupcast response frame BA carries an indication for indicating whether each MAC protocol data unit (MPDU) in the groupcast frames is correct or not. Specifically, the groupcast response frame BA is a BA frame carried with the groupcast address corresponding to the groupcast service and reports a bitmap. In the embodiments of the present disclosure, the bitmap is referred to as a groupcast data response bitmap. Each bit in the bitmap corresponds to one data unit of the groupcast service. A bit set as 1 indicates a correct reception; and a bit set as 0 indicates that the data unit has not been correctly received. Generally, at least one bit in the bitmap is set as 1. The AP triggers STA1 to STA10 to reply with the groupcast response frame. Different from a traditional interaction of BAR/BA frames, a trigger frame transmitted by the AP does not specify which one of STA1 to STA10 transmits the groupcast response frame but allocates random access resource blocks for STA1 to STA10 to cause STA1 to STA10 to contend for transmitting the groupcast response frame.

Specifically, the AP transmits multiple groupcast frames of the groupcast service 1 to STA1 to STA10. After transmitting the groupcast frames, the AP transmits the trigger information (which specifically may be trigger frame MU-BAR) to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, in the MU-BAR, a resource block 1 is indicated as a fixed access resource block, and STA1 is instructed to immediately reply with a groupcast response frame BA on the resource block 1 (the indication information includes an identifier of STA1). STA1 receives the trigger information and finds that the AP allocates the fixed access resource block to STA1 itself, and thus STA1 replies with the groupcast response frame on the specified resource block 1. For corresponding resource blocks 2, 3 and 4, the AP indicates that the three resource blocks are random access resource blocks. Specifically, each random access resource block carries a group identifier, which may be a broadcast identifier and a group address of the groupcast service. STA2 to STA10 contend for transmitting the BA on the three resource blocks. A specific contention process is described as follows by taking STA2 as an example.

STA2 receives one or more groupcast frames and determines itself to be a station which contends for transmitting the BA. Specifically, the fixed access resource block allocated by the AP does not correspond to the identifier of STA2, and the AP allocates the random access resource block to STA2 and indicates the groupcast address and/or a groupcast identifier corresponding to the groupcast service 1. However, whether STA2 successfully contends for transmitting the BA is further determined. A factor for determining whether a station can transmit the BA is a correct-rate of the groupcast frames received by the station. If the correct-rate of the received groupcast frames is very poor, the station has a bad receiving effect and needs to notify the AP as quickly as possible. Otherwise, the station is not eager to transmit the BA. Specifically, STA2 acquires the correct-rate of the groupcast frames and compares the correct-rate with a correct-rate threshold preset by a system. For example, the threshold may be predefined as 80%. STA2 does not transmit the BA frame if the correct-rate is higher than 80%, and STA2 randomly selects one of the three random access resource blocks to transmit the BA frame if the correct-rate is lower than the threshold. The above correct-rate threshold may also be notified by the AP in the MU-BAR or another management frame (such as a beacon) or a data/control frame. Similarly, the threshold value may not be limited to the correct-rate of the groupcast frames. For example, a station may generate its own response factor 'a' according to its own reception condition of the groupcast frames. The response factor 'a' may be relevant to the number of allocated random access resource blocks, the number of stations in the groupcast group, a correct-rate of receiving groupcast frames by a receiving end, a priority of the receiving end and the like. If a value of 'a' satisfies the threshold value, the BA is transmitted, otherwise the BA is not transmitted.

Alternatively, STA2 randomly generates a number uniformly distributed within [0, X]. If the number is greater than a threshold T, STA2 transmits the groupcast response frame; otherwise, STA2 does not transmit the groupcast response frame. The threshold may be notified by the AP or be preset.

Alternatively, STA2 is a station that may need to respond, i.e., a station needs to contend for transmitting the BA, but whether STA2 successfully contends for transmitting the BA is further determined. STA2 generates a probability P of transmitting the BA. The probability P may be relevant to many factors such as the correct-rate of the groupcast frames. STA2 randomly transmits the BA with the probability P. Specifically, STA2 may randomly generate a number uniformly distributed within [0, 1]. If the number is smaller than P, STA2 transmits the BA. Otherwise, STA2 does not transmit the BA. In this way, according to practical situations, the receiving end may randomly respond with the BA. The process of generating the probability P of transmitting the BA by the station may be affected by many factors, which may specifically be one or more of the following:

the number of random access resource blocks allocated, the number of stations in the groupcast group, the correct-rate of the groupcast frames received by the groupcast data receiving end and the priority of the groupcast data receiving end.

Furthermore, the trigger information may be the MU-BAR as described above, and the MU-BAR frame may be aggregated in a radio frame where the transmitted data frames of the groupcast service are located or may be transmitted separately. The trigger information may not be the MU-BAR, but is carried in a frame header of the radio frame where the data frames of the groupcast service are located. Specifically, for example, that the trigger information is carried in a MAC frame header of the data frames of the groupcast service may include carrying the trigger information for the groupcast response frame in a control domain which carries control information.

Furthermore, the above random access resource block or fixed access resource block may be a frequency domain resource block or may be resource blocks in other forms, for example, may be a Multiple-Input Multiple-Output (MIMO) spatial domain resource block, a time domain resource block and a code domain multiple access resource block, where the code domain may be a multiple access manner based on a scrambling code or a spreading code. The resource block may also be any combination of the resource blocks in the above various forms.

In addition, the AP may transmit the MU-BAR or the BAR several times to trigger the stations to regularly transmit or contend for transmitting the groupcast response frame.

Embodiment 2

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

The AP and multiple stations STA1 to STA20 constitute a BSS, and a groupcast service 1 is established between the AP and STA1 to STA10. Accordingly, STA1 to STA10 are considered as a groupcast group 1 and are allocated with a groupcast MAC address 1 for identifying the groupcast service.

The AP transmits multiple pieces of data of the groupcast service 1 to STA1 to STA10. After transmitting the data, the AP transmits trigger information (which may be specifically a trigger frame MU-BAR) to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, in the MU-BAR, a resource block 1 is indicated as a fixed access resource block, and STA10 is instructed to immediately reply with a groupcast response frame such as a BA on the resource block 1 (indication information includes an identifier of STA10). For corresponding resource blocks 2, 3 and 4, the AP indicates that the three resource blocks are random access resource blocks. Specifically, each random access resource block carries a group identifier, which may be a broadcast identifier and a group address of the groupcast service. Accordingly, STA1 to STA9 contend for transmitting the BA on the three resource blocks. A specific contention process is described as follows.

The above resource blocks are OFDMA resource blocks, and STA1 contends for an OFDMA random access resource unit (RU) to transmit the groupcast response frame. STA1 contends for channels according to resource block random backoff. Herein, STA1 randomly accesses OFDMA resources. Specifically, STA1 generates its own value 'a' of a random backoff counter. An initial value of 'a' is generated by a resource contention window (RCW). The resource block is an OFDMA resource block, an MIMO resource block, a time domain resource block or a combination thereof. Herein, the resource block is the OFDMA resource block. Accordingly, the RCW is an OFDMA contention window (OCW). Specifically, the initial value is a random integer uniformly distributed within [0, OCW].

Every time STA1 receives the above MU-BAR, STA1 checks the number of random access resource blocks allocated by the MU-BAR, which is 3 as described above. Assuming that a current value of 'a' is 2, then 3 is subtracted from 'a' to obtain 0 ('a' is a non-negative integer), and STA1 transmits the BA. Specifically, STA1 randomly selects one of the three random access resource blocks, and transmits the groupcast response frame BA according to an MCS and other transmission parameters indicated by the MU-BAR. Similarly, STA2 transmits the BA in the same way. Assuming that a current value of 'a' for STA2 is 4, and then 3 is subtracted from 'a' to obtain 1. In this case, STA2 cannot transmit the BA, and continues to wait for the MU-BAR to allocate the random access resource blocks. Assuming that the number of random access resource blocks allocated next time is 2, then 2 is subtracted from the value 1 of 'a' to obtain 0. Accordingly, STA2 may transmit the BA frame.

The RCW value is indicated in signaling transmitted from a groupcast frame transmitting end or is generated by a receiving end. Specifically, the RCW value generated is determined by at least one of the following factors: the number of random access resource blocks allocated by the trigger information, the number of stations in the groupcast group, and a correct-rate of the groupcast frames received by the groupcast data receiving end and a priority of the groupcast data receiving end.

Embodiment 3

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

The AP and multiple stations STA1 to STA20 constitute a BSS, and a groupcast service 1 is established between the AP and STA1 to STA5. Accordingly, STA1 to STA5 are considered as a groupcast group 1. The groupcast group 1 is allocated with a groupcast MAC address 1 for identifying the groupcast service 1, and a groupcast short identifier, i.e., groupcast ID1, is allocated to the groupcast service 1. Likewise, a groupcast service 2 is established between the AP and STA6 to STA10. The groupcast service 2 is allocated with a groupcast MAC address 2 for identifying the groupcast service 2, and a groupcast ID2 is allocated to the groupcast service 2.

The AP transmits multiple groupcast frames of the groupcast service 1 to STA1 to STA5, and then transmits multiple groupcast frames of the groupcast service 2 to STA6 to STA10. After transmitting the groupcast frames, the AP transmits trigger information such as a trigger frame MU-BAR to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, it is indicated in the MU-BAR that all resource blocks are random access resource blocks. However, it is indicated in the MU-BAR that random access resource blocks 1 and 2 carry ID1 or the groupcast address 1, which represents that the resource blocks 1 and 2 are used for random transmission of the groupcast response frame for the groupcast service 1; likewise, it is indicated in the MU-BAR that random access resource block 3 and 4 carry ID2 or the groupcast address 2, which represents that the resource blocks 3 and 4 are used for random transmission of the groupcast response frame for the groupcast service 2. Accordingly, STA1 to STA5 contend for transmitting the BA on the resource blocks 1 and 2, and STA6 to STA10 contend for transmitting the BA on the resource blocks 3 and 4. A specific contention process may be as described in embodiments 1 and 2.

Embodiment 4

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

The AP and multiple stations STA1 to STA20 constitute a BSS, and a groupcast service 1 is established between the AP and STA1 to STA5. Accordingly, STA1 to STA5 are considered as a groupcast group 1, and a groupcast MAC address 1 is allocated for identifying the groupcast service 1. Likewise, a groupcast service 2 is established between the AP and STA5 to STA10, and a groupcast MAC address 2 is allocated for identifying the groupcast service 2. Herein, STA5 belongs to two groupcast services.

The AP transmits multiple pieces of data of the groupcast service 1 to STA1 to STA5, and then transmits multiple pieces of data of the groupcast service 2 to STA5 to STA10. After transmitting the data, the AP transmits trigger information such as a trigger frame MU-BAR to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, it is indicated in the MU-BAR that all resource blocks are random access resource blocks and all the random access resource blocks are commonly used for transmitting groupcast response frames for the groupcast services 1 and 2 (that is, each of all the random access resource blocks carries a groupcast address 1 and a groupcast address 2). Further, indication information of the random access resource blocks may carry a broadcast identifier to represent that the resource blocks are common contention resources. In this way, SAT1 to STA10 contend for transmitting the BA on the four resource blocks. A specific contention process may be as described in embodiments 1 and 2. However, different from the other stations, STA5 receives the data of the two groupcast services. Thus, STA5 may reply with a groupcast response frame BA for multiple services, that is, the groupcast response frame BA includes response information of groupcast frames corresponding to multiple groupcast groups. Each groupcast service corresponds to an information block, which indicates a groupcast identifier or a groupcast address of a corresponding groupcast service and a groupcast frame response bitmap.

Embodiment 5

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

The AP and multiple stations STA1 to STA20 constitute a BSS, and a groupcast service 1 is established between the AP and STA1 to STA10. Accordingly, STA1 to STA10 are considered as a groupcast group 1 and are allocated with a groupcast MAC address 1 for identifying the groupcast service.

The AP transmits multiple groupcast frames of the groupcast service 1 to STA1 to STA10. After transmitting the groupcast frames, the AP transmits trigger information such as a trigger frame BAR or MU-BAR to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, it is indicated in the MU-BAR that resource block 1 is a fixed access resource block, and STA10 is instructed to immediately reply with a groupcast response frame BA on the resource block 1 (i.e., indication information includes an identifier of STA10). For corresponding resource blocks 2, 3 and 4, the AP indicates that the three resource blocks are random access resource blocks. In addition, the AP may specify a type of a groupcast response frame fed back by a station. Specifically, it is instructed by the AP that random access resource block 2 is used for contending for transmitting a block acknowledgement (BA) frame, the resource block 3 is used for contending for transmitting a non-acknowledgement (NACK) frame and the resource block 4 is used for contending for transmitting an acknowledgement (ACK) frame. NACK represents that all the groupcast reception are incorrect, and ACK represents all the groupcast reception are correct. In this case, STA2 to STA10 contend for transmitting the BA on the three resource blocks. A specific contention process is described as follows.

If STA2 receives all the groupcast frames inaccurately, STA2 contends for transmitting an NACK on the resource block 2; if STA3 to STA6 receive all the groupcast frames accurately, STA3 to STA6 may contend for transmitting an ACK on the resource block 3 or contend for transmitting a BA on the resource block 4; if STA6 to STA10 receive some of the groupcast frames accurately, STA6 to STA10 contend for transmitting the BA on the resource block 4. The specific contention process may be as described in the embodiments 1 and 2.

Furthermore, to avoid collisions in the case where multiple stations transmit the NACK/ACK on the same random access resource block, the AP may require all stations to transmit the NACK/ACK on the same resource block with same transmission parameters including a same MCS and a same scrambler seed and the like.

Embodiment 6

In the example, an AP is served as a first node, i.e., a groupcast data transmitting end, and a station is served as a second node, i.e., a groupcast data receiving end. In addition, the groupcast data transmitting end may also be another device such as a base station and a special station capable of communicating with multiple stations. Any device capable of transmitting groupcast data may be considered as the groupcast data transmitting end. Herein, the transmission or reception of the groupcast data actually refers to the transmission or reception of groupcast frames.

The AP and multiple stations STA1 to STA20 constitute a BSS, and a groupcast service 1 is established between the AP and STA1 to STA10. Accordingly, STA1 to STA10 are considered as a groupcast group 1 and are allocated with a groupcast MAC address 1 for identifying the groupcast service.

The AP transmits multiple pieces of data of the groupcast service 1 to STA1 to STA10. After transmitting the data, the AP transmits trigger information such as a trigger frame BAR or MU-BAR to the stations STA1 to STA10. Assuming that a total transmission bandwidth for the MU-BAR is 40 MHz, the entire 40 MHz bandwidth is divided into four OFDMA resource blocks by the MU-BAR and each resource block has corresponding resource indication information in the MU-BAR. Specifically, it is indicated in the MU-BAR that a resource block 1 is a fixed access resource block and STA10 is instructed to immediately reply with a groupcast response frame on the resource block 1 (the indication information includes an identifier of STA10). For corresponding resource blocks 2, 3 and 4, the AP indicates that the three resource blocks are random access resource blocks. In this case, STA2 to STA10 contend for transmitting the groupcast response frame on the three resource blocks, but a type of the groupcast response frame specifically transmitted by these stations is determined by a reception condition of these stations.

If STA2 receives all the data inaccurately, STA2 contends for transmitting an NACK on the three resource blocks. If STA3 to STA6 receive all the data accurately, STA3 to STA6 may contend for transmitting an ACK/BA on the three resource blocks. If STA6 to STA10 receive some of the data accurately, STA6 to STA10 contend for transmitting the BA on the three resource blocks. A specific contention process may be as described in embodiments 1 and 2.

In addition, if a station served as the receiving end receives data of multiple groupcast services, the station may also contend for transmitting a BA of multiple services on the random access resource blocks. Alternatively, if the station also needs to respond to a unicast service, the station may transmit a BA for multiple services, some response information of which is for the groupcast service and some response information is for the unicast service.

The same is true for the above STA1: a type of the regularly transmitted groupcast response frame may also be the ACK, the NACK, the BA or the BA for multiple services according to a data service to be responded to.

It should be understood by those skilled in the art that the embodiments of the present disclosure may be provided as methods, systems or computer program products. Therefore, the present disclosure may adopt a mode of a hardware embodiment, a software embodiment, or a combination of hardware and software embodiment. In addition, the present disclosure may adopt a form of a computer program product implemented on one or more computer-usable storage media (including, but not limited to, a disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of another programmable data processing device to produce a machine so that instructions executed by a computer or a processor of another programmable data processing device produce a means for implementing functions specified in one or more flows in the flowcharts and/or one or more blocks in the block diagrams.

These computer program instructions can also be stored in a computer-readable memory which can direct a computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions can also be loaded onto a computer or another programmable data processing device so that a series of operations and steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

Accordingly, the embodiment of the present disclosure further provide a computer storage medium which stores computer instructions configured to execute the response method for groupcast data transmission according to the embodiments of the present disclosure.

The above are only preferred embodiments of the present disclosure and are not intended to limit the scope of the present disclosure.

INDUSTRIAL APPLICABILITY

The embodiments of the present disclosure provide the following technical solutions: a first node transmits at least one groupcast frame to at least one groupcast group, each of which includes more than one second node; the first node transmits trigger information to a plurality of second nodes corresponding to the at least one groupcast group, where the trigger information is configured to trigger the second node to contend for transmitting a groupcast response frame on a specified random access resource block and/or trigger a specified second node to transmit the groupcast response frame on a specified fixed access resource block; and the first node receives the groupcast response frame transmitted from the plurality of second nodes. In can be seen that the first node allocates random access resources and/or fixed access resources corresponding to the groupcast response frame based on the trigger information, so that the second nodes contend for transmitting the groupcast response frame and/or regularly transmit the groupcast response frame according to qualities of the groupcast frames received by the second nodes. Therefore, the first node such as an AP can better confirm a reception condition of groupcast data, which facilitates subsequent retransmission of the groupcast data.

What is claimed is:

1. A response method for groupcast data transmission, applied to a first node, comprising:
   transmitting, by the first node, at least one groupcast frame to at least one groupcast group, wherein each of the at least one groupcast group comprises more than one second node;
   transmitting, by the first node, trigger information to a plurality of second nodes corresponding to the at least one groupcast group, wherein the trigger information is configured to trigger the plurality of second nodes to contend for transmitting a groupcast response frame on a specified random access resource block according to a correct-rate of the groupcast frame received by the second nodes, or the trigger information is configured to trigger the plurality of second nodes to contend for transmitting a groupcast response frame on a specified random access resource block according to a correct-rate of the groupcast frame received by the second nodes and trigger a specified second node to transmit the groupcast response frame on a specified fixed access resource block; and
   receiving, by the first node, the groupcast response frame transmitted from the plurality of second nodes.

2. The response method for groupcast data transmission of claim 1, wherein the trigger information is one of the followings: a multi-user block acknowledgment request (MU-BAR) frame, a block acknowledgment request (BAR) frame and an information field for triggering the groupcast response frame; and
   the trigger information is further configured to allocate the fixed access resource block or the random access resource block for triggering the groupcast response frame.

3. The response method for groupcast data transmission of claim 1, wherein the access resource block corresponds to resource indication information, the resource indication information is configured to indicate a resource corresponding to the access resource block, and is carried in the trigger information.

4. The response method for groupcast data transmission of claim 3, wherein
   the resource indication information corresponding to the random access resource block comprises at least one of a groupcast address and a groupcast identifier; and the resource indication information corresponding to the fixed access resource block comprises at least one of the groupcast address and a unicast identifier.

5. The response method for groupcast data transmission of claim 1, wherein
the trigger information is aggregated in a media access control (MAC) frame header of the at least one groupcast frame;
the trigger information is aggregated in a radio frame where the at least one groupcast frame is located; or
the trigger information and the at least one groupcast frame are located in different radio frames.

6. The response method for groupcast data transmission of claim 1, further comprising: transmitting, by the first node, random access control information about the random access resource block, wherein the random access control information comprises at least one of the following:
a response threshold of the second node;
a random access resource contention window (RCW) of the second node; and
indication information for indicating a type of the groupcast response frame.

7. The response method for groupcast data transmission of claim 6, wherein
the response threshold is a control threshold for a correct-rate of corresponding groupcast frame or a random access probability; and
the type of the groupcast response frame is one of: a block acknowledgement frame, an acknowledgement frame and a non-acknowledgment frame.

8. The response method for groupcast data transmission of claim 7, wherein when the type of the groupcast response frame is the block acknowledgement frame, the indication information for indicating the type of the groupcast response frame further indicates that the block acknowledgement frame is a groupcast data block acknowledgement frame, a compressed block acknowledgement frame or a multi-user block acknowledgement frame.

9. A response method for groupcast data transmission, applied to a second node, comprising:
receiving, by the second node, at least one groupcast frame, wherein a groupcast address carried in each of the at least one groupcast frame corresponds to a groupcast group where the second node is located;
receiving, by the second node, trigger information transmitted from a first node;
when the second node is determined to be a second node for randomly contending for transmitting a groupcast response frame, contending, by the second node, for transmitting the groupcast response frame on a random access resource block allocated by the trigger information according to a correct-rate of the groupcast frame received by the second nodes; and
when the second node is determined to be a second node for regularly transmitting the groupcast response frame, transmitting, by the second node, the groupcast response frame on a specified fixed access resource block according to the trigger information.

10. The response method for groupcast data transmission of claim 9, wherein when the random access resource block allocated by the trigger information corresponds to a groupcast address or a groupcast identifier of the groupcast group where the second node is located, and the fixed access resource block allocated by the trigger information does not correspond to an address or a unicast identifier of the second node, the second node is determined to be the second node for randomly contending for transmitting the groupcast response frame; and
when the fixed access resource block allocated by the trigger information corresponds to the address or the unicast identifier of the second node and the random access resource block allocated by the trigger information does not correspond to the groupcast address or the groupcast identifier of the groupcast group where the second node is located, the second node is determined to be the second node for regularly transmitting the groupcast response frame.

11. The response method for groupcast data transmission of claim 9, wherein when the second node belongs to a plurality of groupcast groups, the groupcast response frame comprises response information of groupcast frames corresponding to the plurality of groupcast groups.

12. The response method for groupcast data transmission of claim 11, wherein the response information of groupcast frames corresponding to each of the plurality of groupcast groups comprises a groupcast identifier or a groupcast address of the each of the plurality of groupcast groups, and a groupcast data response bitmap.

13. The response method for groupcast data transmission of claim 9, wherein the contending, by the second node, for transmitting the groupcast response frame comprises:
transmitting, by the second node, the groupcast response frame by using one of at least one random access resource block allocated by contention trigger information of a resource block contention counter; or
contending, by the second node, for transmitting the groupcast response frame by determining whether a response threshold is satisfied.

14. The response method for groupcast data transmission of claim 13, wherein the contending, by the second node, for transmitting the groupcast response frame by determining whether a response threshold is satisfied comprises:
determining a correct-rate of the at least one groupcast frame received by the second node; and
transmitting the groupcast response frame on one of at least one random access resource block allocated if the correct-rate satisfies a first threshold or a value generated by the correct-rate satisfies a second threshold; otherwise, transmitting no groupcast response frame.

15. The response method for groupcast data transmission of claim 13, wherein an initial value of the resource block contention counter is generated by a resource contention window (RCW), wherein the initial value is a random integer uniformly distributed within a range from 0 to an RCW value.

16. The response method for groupcast data transmission of claim 15, wherein
the RCW value is determined by an indication message transmitted from the first node; or
the RCW value is generated by the second node, and the RCW value generated is determined by at least one of the following factors: a total number of random access resource blocks allocated by the trigger information, a total number of stations in the groupcast group, and a correct-rate of the at least one groupcast frame received by the second node and a priority of the second node.

17. The response method for groupcast data transmission of claim 13, wherein the second node contends for transmitting the groupcast response frame by using the resource block contention counter in the following manner:
after receiving the trigger information, the second node determines the number of random access resource blocks according to the trigger information, adjusts a value of the resource block contention counter according to the number of random access resource blocks, and transmits the groupcast response frame when the value of the resource block contention counter is 0 or otherwise transmits no groupcast response frame;

wherein the value of the resource block contention counter is adjusted by subtracting the number of random access resource blocks from a current value of the resource block contention counter.

18. The response method for groupcast data transmission of claim 9, wherein a type of the groupcast response frame is a block acknowledgement frame, an acknowledgement frame or a non-acknowledgment frame; and the type of the groupcast response frame is determined in the following manner:

the second node determines the type of the groupcast response frame according to an indication of the first node, wherein the indication is specifically as follows: transmitting a corresponding type of groupcast response frame on a specified randomly accessed resource; or the second node determines the type of the groupcast response frame to be transmitted according to a reception correct-rate of the at least one groupcast frame, which specifically comprises the following cases:

when all of the at least one groupcast frame are correct, the type of the groupcast response frame is the acknowledgement frame or the block acknowledgement frame; when all of the at least one groupcast frame are wrong, the type of the groupcast response frame is the non-acknowledgment frame; and when part of the at least one groupcast frame is correct, the type of the groupcast response frame is the block acknowledgement frame.

19. A response device for groupcast data transmission, applied to a first node, comprising a processor and a storage device for storing computer executable instructions that when executed by the processor cause the processor to:

transmit at least one groupcast frame to at least one groupcast group, wherein each of the at least one groupcast group comprises more than one second node; and transmit trigger information to a plurality of second nodes corresponding to the at least one groupcast group, wherein the trigger information is configured to trigger the plurality of second nodes to contend for transmitting a groupcast response frame on a specified random access resource block according to a correct-rate of the groupcast frame received by the second nodes, or the trigger information is configured to trigger the plurality of second nodes to contend for transmitting a groupcast response frame on a specified random access resource block according to a correct-rate of the groupcast frame received by the second nodes and trigger a specified second node to transmit the groupcast response frame on a specified fixed access resource block; and receive the groupcast response frame transmitted from the plurality of second nodes.

20. A response device for groupcast data transmission, applied to a second node, comprising a processor and a storage device for storing computer executable instructions that when executed by the processor cause the processor to perform the followings to implement the response method for groupcast data transmission according to claim 9:

receiving at least one groupcast frame, wherein a groupcast address carried in each of the at least one groupcast frame corresponds to a groupcast group where the second node is located; and receiving trigger information transmitted from a first node; and contending for transmitting a groupcast response frame on a random access resource block allocated by the trigger information according to a correct-rate of the groupcast frame received by the second nodes when the second node is determined to be a second node for randomly contending for transmitting the groupcast response frame; and transmitting the groupcast response frame on a specified fixed access resource block according to the trigger information when the second node is determined to be a second node for regularly transmitting the groupcast response frame.

* * * * *